Patented Mar. 27, 1945

2,372,526

UNITED STATES PATENT OFFICE 2,372,526

PROCESS FOR REMOVING PHENYLACETYLENE FROM STYRENE

Frank J. Soday, Swarthmore, Pa., assignor to The United Gas Improvement Company, a corporation of Pennsylvania No Drawing. Application September 5, 1941,
Serial No. 409,682

6 Claims. (Cl. 260—669)

This invention pertains generally to the depolymerization of styrene polymers.

More specifically, this invention pertains to the isolation of styrene from the residual polymers obtained when styrene or styrene fractions are distilled or fractionated. Another object of the invention is the provision of a method whereby the overall recovery of styrene from a dilute fraction containing the same when such fraction is subjected to distillation or fractionation operations is largely increased. Still another object of the invention is the isolation of styrene from mixed polymers containing the same obtained as a by-product of the refining operations leading to the production of concentrated styrene fractions from light oil. A further object of the invention is the depolymerization of styrene polymers obtained as a by-product of distilling and/or fractionating operations by the application of heat thereto when in the form of a thin layer or film, or in a finely divided form. Other objects and advantages of the invention will be apparent to those skilled in the art upon an inspection of the specification and claims.

In the various processes which have been developed for the manufacture of artificial gas, such as oil gas, carburetted water gas, or coal gas, considerable quantities of tar are produced, and the gas contains substantial quantities of readily condensible materials.

The condensate obtained from the artificial gas, as well as the light oil obtained upon distillation of the tar, constitute sources for many unsaturated and aromatic hydrocarbons. The light oil obtained from the pyrolysis of petroleum or of petroleum hydrocarbons is especially rich in unsaturated hydrocarbons, particularly when temperatures in excess of 1100° F. have been employed in the cracking operations. Included among these unsaturated hydrocarbons is styrene.

Although the light oil from which styrene may be isolated has been available in commercial quantities for several decades, the difficulties inherent in obtaining concentrated styrene fractions and/or pure or substantially pure styrene from light oil has been such as to preclude the commercial exploitation of these materials. Instead, the so-called crude light naphtha in which they occur has been used generally for the production of resins of inferior quality and dark color, as a cut-back for tar or asphalt, or for fuel purposes. In certain of these methods of utilization of crude light naphtha, the styrene present has been regarded as an undesirable impurity as it tends to darken the color of the resins obtained from such fractions when employing established methods for the resinification thereof.

This lack of commercial utilization of light oil styrene fractions can be directly traced to the lack of a satisfactory method for their isolation in the form of concentrated fractions, or in a pure or relatively pure form.

A logical approach to the problem of obtaining concentrated styrene fractions from light oil, or from other dilute fractions or solutions containing the same, is the fractional distillation of such fractions. It has been found, however, that the application of such methods to dilute styrene fractions results in the loss of a very substantial portion of the styrene present in such fractions in the form of polymers. Thus, for example, the fractional distillation of light oil containing styrene in commercial installations results in the conversion of 50%, or more, of the styrene present to polymers in many cases. Such polymers are usually dark in color, possess a low melting point, and have very few, if any commercial applications.

Although such losses may be substantially reduced by the application of more highly refined fractional distillation procedures, such as, for example, the use of lower operating pressures, the use of fractional distillation columns designed to operate with a very low pressure drop, and by the use of certain polymerizing inhibitors, such as hydroquinone, the losses incurred through the polymerization of the styrene present in dilute styrene fractions upon fractional distillation thereof to produce fractions containing 50%, or more, of styrene are still sufficiently large to seriously interfere with the production of such concentrated fractions. As losses of 20%, or more, of the styrene present in the original fraction when preparing fractions containing 50%, or more, of styrene therefrom are not uncommon, the preparation of such concentrated fractions upon a commercial scale has been found to be uneconomical in many cases.

As the result of extensive experimentation, I have found that the polymers or still residues obtained from the distillation of styrene fractions may be depolymerized to form monomeric styrene by the application of heat to such polymers in attenuated form, thus resulting in the recovery of a very considerable portion, or all, of the styrene formerly lost in this manner.

The depolymerization of the still residues are carried out under carefully controlled conditions in order to obtain satisfactory yields of styrene.

This is illustrated by the following example, in which a still residue obtained by the fractional distillation of a light oil styrene fraction was depolymerized by bulk heating methods.

Example

A sample of light oil from oil gas was fractionated in a 40-plate column in the presence of a small quantity of hydroquinone at a pressure of 40 mm. of mercury, absolute. The major portion of the styrene present in the light oil was isolated in the form of a 60% light oil styrene fraction. Approximately 10% by weight of the styrene present in the original light oil was converted to polymers during this process.

After removing the still residues from the still, the unpolymerized material present in the said still residues was removed by distillation under reduced pressure. This resulted in the isolation of a dark colored, brittle polymer.

A 200 gram portion of this polymer was placed in a small vessel and rapidly heated by means of a suitable burner. The depolymerized material was condensed in a water-cooled condenser and collected in a receiver cooled with solid carbon dioxide. The heating was continued until no further quantities of distillate could be obtained.

Approximately 65% by weight of the polymer was converted to liquid products by this procedure, the remainder being a charred, coke-like mass in the bottom of the reaction vessel.

Upon fractionating the liquid products, substantially pure styrene was obtained. The quantity isolated amounted to approximately 30% by weight of the polymer initially depolymerized. The remainder of the liquid product comprised oils boiling below and above the boiling point of styrene.

It is apparent that this procedure is too imperfect to permit it to be used for the recovery of styrene from still residues obtained upon the fractionation of styrene fractions upon a commercial scale as the yield of styrene from the said still residues is far too low. In addition, the charred, coke-like mass not only represents an economic loss of potentially valuable raw material, but it can be removed from the reaction vessel only by the application of considerable force. It is difficult to see how this residual material could be removed from reaction vessels of commercial size in a satisfactory manner without the expenditure of a prohibitive amount of labor.

These unsatisfactory results have been found to be due to the tendency of the still residues obtained upon the fractionation of styrene fractions to decompose with the formation of carbonaceous products upon prolonged heating at elevated temperatures, and to the poor heat conductivity of such polymers. Thus, upon the application of heat to a relatively large mass of the polymers obtained from styrene still residues, the layer of resin adjacent to the source of heat decomposes. In order to decompose the major portion of the remainder of the polymer present, however, the application of very elevated temperatures for prolonged periods of time is required. Consequently, a considerable portion of the polymer is carbonized, while relatively large quantities of undesired oils are obtained, both as a result of the partial depolymerization of the polymer and the recombination of a portion of the styrene obtained.

As pointed out previously, I have found that styrene may be obtained in excellent yields through the depolymerization of still residues obtained by the fractional distillation of fractions containing styrene by the application of heat to such still residues in attenuated form.

This process is especially applicable to the residues obtained upon the fractionation of the light oils obtained from tars of the character described.

As the light oil employed in the preparation of concentrated styrene fractions by fractional distillation methods commonly contains one or more methyl styrenes or other substituted styrenes, particularly when light oil possessing a fairly wide boiling range is employed for this purpose, the still residues obtained from wide boiling light oil fractions may comprise a mixture of styrene and one or more substituted styrene polymers and/or copolymers.

In the case of the recovery of both purified styrene and purified ring-substituted methyl styrene by methods involving the depolymerization of still residues produced by the fractional distillation of light oil fractions containing both styrene and ring substituted methyl styrene, reference is made to my copending applications Serial No. 427,418 filed January 20, 1942, and Serial No. 430,717 filed February 13, 1942.

As the still residues are commonly drained from the still pot or reboiler, either continuously or discontinuously, before all of the unpolymerized material has been distilled therefrom in order to assist in the removal of the still residues from the unit, such materials may be treated to remove all unpolymerized material present prior to the depolymerization thereof. This can be carried out in any desired manner. Thus, for example, the still residues may be distilled, preferably under reduced pressure and/or the application of superheated steam, until all of the unpolymerized material has been removed.

Other methods of isolating the polymer from the still residues may be used, if desired. Thus, for example, the polymer may be precipitated from its solution in the unpolymerized materials present in the still residues by the addition of a non-solvent for the polymer therein, such as alcohol. The precipitated polymer then may be further processed to remove unpolymerized material, if desired, such as by working it on heated rolls, or otherwise.

The still residues also may be processed to remove unpolymerized material, among other ways, by spray drying methods such as by spraying the still residue into a heated tower, either alone or in conjunction with the use of steam or an inert gas to assist in removing the unpolymerized material, by working the material on hot rolls to remove unpolymerized material, or by other methods.

It is desirable that all, or substantially all, of the unpolymerized material present in the still residues be removed prior to the depolymerization of the polymer contained therein. Otherwise, such unpolymerized materials will dilute or contaminate the styrene obtained from the depolymerizing process.

An entirely unexpected advantage derived from the application of the depolymerizing process described herein to styrene polymers obtained from the still residues resulting from the distillation of light oil styrene fractions is the substantially complete elimination of certain undesired impurities, such as certain other unsaturated hydrocarbons as phenylacetylene, oxygen compounds, nitrogen compounds, and sulfur compounds. Accordingly, the styrene obtained from the polymers isolated from the still residues resulting from the distillation of light oil styrene fractions is free from the impurities present in the original fraction. This is of very considerable economic importance as the removal of such impurities normally is a very troublesome and expensive procedure.

The styrene polymers obtained from the still residues resulting from the fractionation of styrene fractions may be introduced into the depolymerizing units to be described presently in any desired form. Such polymers may be in the form of high, medium or low-melting polymers or even liquid polymers depending, among other things, upon the temperature employed in the said distillation processes, as well as upon the time required for the distillation and the nature of the styrene fraction being distilled. Low molecular weight polymers are well adapted for use in the depolymerizing processes disclosed herein.

In general, it may be said that one method of introducing the polymer obtained from the styrene still residues into the depolymerizing zone comprises its introduction in liquid form. This implies the use of a liquid polymer, or of a molten polymer in which the polymer has been converted to the liquid form by the application of heat prior to its introduction into the depolymerizing zone.

Another method of introducing the polymer into the depolymerizing zone comprises dissolving it in some solvent or mixture of solvents. Care should be exercised in choosing the solvent, as in most cases it will be found desirable to separate the solvent from the monomeric styrene after the depolymerizing process has been completed. Consequently, a solvent or mixture of solvents having a boiling point sufficiently far removed from that of styrene to enable the respective components to be separated by fractionation, or by other methods, should preferably be used to dissolve the polymer. Benzene and toluene are suitable solvents for this purpose.

A combination of the foregoing methods comprises melting a mixture of solvent and polymer by the application of heat. By the use of this method, relatively small quantities of solvent and moderate temperatures may be employed in the production of a liquid mixture to be introduced into the depolymerizing unit. This may be advantageous in certain cases, particularly from the standpoint of solvent economy.

In the case of the depolymerization of the separated polymer in the presence of a relatively inert solvent therefor having a boiling point sufficiently different from that of styrene as to be readily separable therefrom, reference is made to my copending application Serial No. 427,419 filed January 20, 1942. In the case of the employment of a polymerizable solvent for the polymer, reference is made to my copending application Serial No. 428,833 filed January 30, 1942.

Another method of introducing the polymer into the depolymerizing zone comprises its reduction to a fairly finely divided form. This may be accomplished, among other ways, by mechanical grinding, machining, or other dispersion methods, or by spray drying or dispersion methods, or otherwise. These methods also may be carried out in such a way that the final product contains appreciable quantities of solvent, if desired.

The depolymerization of the foregoing polymers may be carried out in the presence or absence of certain diluents in the reaction zone, such as steam, solvents, particularly relatively low boiling solvents such as petroleum ether, benzene, and toluene, and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto.

The depolymerizing operations may be carried out at atmospheric, sub-atmospheric, or super-atmospheric pressures. In general, atmospheric or sub-atmospheric pressures are preferred.

As the majority of the styrene polymers obtained from still residues are stable at temperatures below 300–350° C., temperatures above this range normally must be employed in order to obtain satisfactory yields of styrene within a reasonable period of time. I have found that the use of temperatures above 400° C. and, particularly, above 500° C. are very satisfactory for the production of styrene according to the methods described herein. Temperatures above 600° C. give excellent yields of styrene.

The polymer or polymer solution may be heated to any desired temperature prior to its introduction into the reaction zone, if desired. Thus, for example, it may be heated to a temperature just under the initial decomposition temperature before being introduced into the reaction zone. In case a relatively low boiling solvent is present, the polymer-solvent mixture may be heated under a pressure sufficient to maintain the solvent in the liquid state at the chosen temperature prior to its addition to the reaction zone.

An alternative method of introducing the polymer to the reaction zone comprises carburetting it with steam, a solvent or other liquid in the vapor state, an inert gas, or other suitable agent. This method is especially applicable to liquid polymers or to relatively low-melting polymers possessing an appreciable vapor pressure at temperatures below their initial depolymerizing temperature. Thus, for example, a liquid styrene polymer obtained, for example, from fractionation operations in which relatively high temperatures have been employed, may be heated to a temperature of, say, 200° C. in a suitable vessel. A suitable carbureting medium such as, for example, superheated steam is passed through the heated liquid polymer, the mixture of steam and polymer then being delivered to the reaction zone. By a suitable control of the type of polymer employed, the temperature to which it has been heated, and the temperature of the steam employed for carbureting purposes, almost any desired ratio of steam and polymer may be delivered to the reaction zone.

In the foregoing methods, the polymer may be delivered to the reaction zone in the form of a thin layer or stream, or in the form of a spray or mist of finely divided particles, depending, among other things, upon the type of fitting employed at the termination of the delivery pipe or other device in the reaction zone.

Another method of introducing the polymer to the reaction zone comprises its addition in a finely divided form in the solid state. This may be accomplished, among other ways, by blowing a stream of the finely divided solid polymer into the reaction zone by means of a continuous blast or stream of an inert gas, the finely powdered polymer being mechanically introduced into such a stream prior to its introduction into the reaction zone.

As pointed out previously, I have found that styrene polymers obtained from the still residues resulting from the fractionation of styrene fractions may be readily depolymerized to give good yields of styrene by the application of heat to such polymers in attenuated form for a time sufficient to effect the desired depolymerization. Any suitable procedure capable of meeting these conditions may be used for the depolymerization of such polymers.

Thus, for example, the polymer, or polymer solution, may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of styrene in good yields from its polymers by thermal depolymerization. In general, the clearance between the heated walls of such vessels and the agitator or scraper should preferably not be more than ¼" and, more preferably, not more than ⅛". Excellent results are obtained when the clearance between the two surfaces is 1/16" or less, and the optimum results are obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of styrene by the thermal depolymerization of polymers from still residues.

The resin is distributed on the bottom and sides of the reactor by means of the agitator blade, the rate of flow of the resin and the depolymerizing temperature usually being so regulated that only a thin film of resin is present on the bottom and sides of the reaction vessel at any given period of time.

The foregoing represents one method of depolymerizing styrene polymers obtained from the still residues resulting from the distillation of dilute styrene fractions by depositing them in the form of a thin film, or otherwise, upon the interior of a reaction vessel, an agitator being employed to prevent or retard any undesirable accumulation of polymer upon the interior surface thereof. A large number of similar devices or units embodying the same principles may be employed for the depolymerization of styrene polymers if desired.

It will be understood of course that the foregoing units only serve to illustrate one method of realizing the advantages of the invention and are not to be construed as limiting it in any way. In general, any method of depositing a relatively thin layer of the desired polymer upon a heated surface will serve to depolymerize the polymer in a satisfactory manner.

Another suitable method for the depolymerization of styrene polymers obtained from the still residues resulting from the distillation of styrene fractions comprises contacting such polymers with a molten metal, alloy, salt, mixture of salts, or other liquids capable of withstanding relatively high temperatures without appreciable decomposition.

The polymer may be delivered to the interior of the reaction vessel in any desired form, such as in the form of a thin stream, ribbon, or spray by the use of suitable constrictions or devices on the lower end of the charging tube. Likewise, the polymer may be delivered above or below the level of the molten heating material in the unit. The polymer may be delivered to the unit as such, or in combination with one or more assisting agents such as steam, solvents, gases, or the like.

During the operation of the unit, the molten metal or other material may be agitated to any desired extent, although such agitation is not necessary in all cases. The unit may be opened from time to time to remove any residual material present, or the molten metal may be removed, skimmed, and returned to the unit, either continuously, discontinuously, or otherwise. As a general rule, very little, if any, carbonaceous residues or other undesirable solid by-products are generated in the process due to the excellent contact between the heating medium and the material to be depolymerized.

An excellent method for the depolymerization of styrene polymers obtained from the still residues resulting from the distillation of styrene fractions comprises the application of heat thereto while in a very finely divided form. Any desired method of subdividing the polymers may be employed, such as pumping or forcing the polymers in liquid or molten condition, or in the form of a solution in certain solvents, though a suitable nozzle, orifice, constriction, or fitting designed to subdivide the stream into a relatively large number of small discrete particles. Other methods of accomplishing this purpose may, of course, be used if desired. Thus, for example, the polymer or polymer solution may be pumped, flowed, or otherwise delivered to the top of a suitable tower or vessel and permitted to flow over a perforated plate or screen, or both, or otherwise, in such a manner as to disperse the material in the form of very thin streams, or drops, or otherwise.

Other methods and devices suitable for contacting the finely divided polymer or polymer solution may, of course, be employed. Thus, for example, the reaction vessel or tower may be conical in shape in order to prevent or retard any undue accumulation of polymer on the sides of the vessel. Other refinements will, of course, be apparent to those skilled in the art.

Another suitable method of depolymerizing styrene polymers obtained from the still residues resulting from the distillation of styrene fractions is to pump, blow, or otherwise force them through a tubular unit possessing a fairly narrow cross-sectional area, preferably while the polymer or polymer solution is in a finely divided or vaporized form, or otherwise. A pipe coil, tube bundle, or conventional cracking furnace may be used for this purpose with excellent results.

Other methods familiar to those engaged in the pyrolysis of petroleum may be used, if desired. Other types of furnaces also may be employed, such as the de Florez furnace, a tube coil immersed in a molten metal bath, and the like.

In addition, the polymer or polymer solution or admixture may be charged to a conventional gas set, or a modification thereof, such as those employed for the production of blue gas, oil gas, carburetted water gas, and the like.

Other methods based upon heating a stream of finely divided styrene polymers, either alone or in conjunction with one or more assisting agents such as steam, a solvent, a gas, or a mixture thereof, may be used, if desired.

It is to be understood, also, that any combination of the foregoing depolymerizing methods may be used for the production of styrene from the polymers obtained from the still residues resulting from the distillation of styrene fractions.

The method of condensing the depolymerized materials obtained also is important from the standpoint of obtaining good yields of styrene. The vapors should be condensed and cooled as rapidly as possible in order to prevent any recombination of the styrene obtained and to prevent side reactions from occurring to any substantial degree. This may be accomplished by conducting the vapors into an efficient condenser and cooler as quickly as possible, a satisfactory condenser for this purpose being a water cooled sheet and tube condenser. The depolymerized materials also may be shock-cooled if desired, such as by injecting a spray or stream of water or other cooling medium directly into the depolymerized products obtained from the reaction zone, or by passing the depolymerized vapors through a wash box filled with water, or otherwise.

In general, it may be said that the best results are obtained when the polymer is depolymerized in the form of thin films or small discrete particles or streams in the shortest possible period of time, then condensing and cooling the depolymerized products in the shortest possible period of time. Any undue increase in the depolymerizing time, or the time required to condense and cool the depolymerized materials, usually is reflected in decreased yields and in the presence of higher boiling oils and other undesirable by-products in the styrene obtained.

The steam, solvents, gases, or mixtures thereof, which may be charged to the depolymerizing unit with the polymer assist in the reaction in many ways. They may serve to transmit heat directly to the polymer, to assist in sweeping out the products of the depolymerization from the reaction zone in the shortest possible period of time, and to serve as diluting agents, thus preventing, or reducing the rate of, the recombination of the depolymerized materials.

As pointed out previously, also, the steam, solvent vapors, gases, or mixtures thereof used as assisting agents in the depolymerization of styrene polymers obtained from the still residues resulting from the distillation of styrene fractions may be preheated to any desired extent before being added to the polymer or introduced into the reaction zone, or otherwise, and such agent or agents may be used as the sole source of heat, if desired.

By the use of the foregoing methods for the depolymerization of styrene polymers obtained from the still residues resulting from the distillation of styrene fractions, all of which are based upon the principle of exposing a limited quantity of the said polymers to elevated temperatures for a limited period of time under conditions designed to effect a rapid transfer of heat from the heating surface or medium to the polymer and removing the depolymerized materials from the heating zone and condensing and cooling them as rapidly as possible, excellent yields of styrene may be obtained.

It should be emphasized that the depolymerization should be carried out in a relatively short period of time. The application of elevated temperatures to styrene polymers of the type described herein for prolonged periods of time, such as are encountered for example in batch depolymerizing methods, results in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone should rarely exceed 10 minutes and, in most cases will not exceed 5 minutes. Contact times substantially under 5 minutes and, more particularly, under 1 minute, will be found to give excellent results.

The use of an assisting agent, such as steam, a solvent, a gas, or a mixture thereof during the depolymerizing process will materially reduce the contact time in the depolymerizing unit.

By depolymerizing styrene polymers obtained from the still residues resulting from the fractionation of styrene fractions or mixtures of such styrene polymers with other materials according to the method described, particularly when units of the type illustrated are used for this purpose, excellent yields of styrene containing very little, if any, higher boiling oils and/or other undesirable by-products are obtained. Thus, for example, the depolymerization of styrene polymers obtained from the still residues resulting from the fractionation of a light oil styrene fraction obtained from oil gas at temperatures of, say 450–650° C. and a contact time substantially under, say, 3 minutes will give yields of styrene up to 70% by weight of the original polymer, or even higher.

By the practice of my process, styrene of 98% purity and higher, whether in solution in a considerable quantity of solvent or not, is readily obtainable.

For the purposes of the specification and the claims, the term "attenuated form," or its equivalent, unless otherwise modified is intended to embrace sheet form, spray form, discrete particle form, small stream form, filament form, vapor form and similarly divided forms adapted for rapid heat transfer throughout the body of the material in process.

While specific procedures for the depolymerization of styrene polymers obtained from still residues resulting from the distillation of styrene fractions or solutions have been particularly described, as well as the units in which such depolymerizations may be conducted, it is to be understood that these are by way of illustration only. Therefore, changes, omissions, additions, substitutions, and/or modifications may be made within the scope of the claims without departing from the spirit of the invention.

I claim:

1. A method for the recovery of purified styrene from a light oil styrene fraction containing contamination in the form of phenyl acetylene which comprises subjecting said light oil styrene fraction to fractional distillation thereby obtaining a still residue containing polymerized material including polymerized styrene, separating said polymerized material from unpolymerized material contained in said still residue, subjecting said separated polymer in attenuated form to temperature conditions at least as high as 350° C. for a period of time sufficient to effect depolymerization but insufficient to cause the formation of substantial proportions of high boiling oil, and recovering monomeric styrene in purified form and substantially less contaminated with phenyl acetylene.

2. A method for the recovery of purified styrene from a light oil styrene fraction contaminated with phenyl acetylene which comprises subjecting said fraction to fractional distillation thereby obtaining a still residue containing polymerized material containing polymerized styrene, separating said polymerized material from unpolymerized material contained in said still residue, subjecting said separated polymer in attenuated form to temperature conditions at least as high as 400° C. for a period of time sufficient to cause depolymerization but not exceeding five minutes, and recovering monomeric styrene substantially less contaminated with phenyl acetylene.

3. A method for the production of purified styrene from a light oil styrene fraction containing impurity in the form of phenyl acetylene which comprises fractionally distilling said light oil styrene fraction thereby obtaining a still residue containing polymerized material including polymerized styrene, separating said polymerized material from unpolymerized material contained in said still residue, subjecting said separated polymerized material in attenuated form to heating under temperature conditions between 350° C. and 600° C. for a period of time sufficiently long to effect depolymerization while removing and condensing resulting vapor phase material substantially as rapidly as formed to recover monomeric styrene less contaminated with phenyl acetylene.

4. A method for the production of purified styrene from a light oil styrene fraction containing phenyl acetylene contamination which comprises subjecting said fraction to fractional distillation and thereby obtaining a still residue containing polymerized material comprising polymerized styrene, separating said polymerized material from unpolymerized material contained in said still residue, heating said separated polymerized material in attenuated form and in the presence of a vapor phase diluent under temperature conditions between 350° C. and 600° C. for a period of time sufficiently long to effect depolymerization while removing and condensing resulting vapor phase material substantially as rapidly as formed to recover monomeric styrene in purified form and substantially less contaminated with phenyl acetylene.

5. A method of recovering monomeric styrene substantially free from phenyl acetylene from a styrene light oil fraction containing a substantial proportion of phenyl acetylene as an impurity comprising subjecting said light oil styrene fraction to fractional distillation and thereby obtaining a still residue containing polymerized material including polymerized styrene, separating said polymerized material from unpolymerized material contained in said still residue, heating said separated polymerized material in attenuated form under temperature conditions between 400° C. and 600° C. for a period of time sufficient to cause depolymerization but not exceeding one minute, and recovering monomeric styrene in purified form and substantially free from phenyl acetylene.

6. A method for recovering purified styrene from a light oil styrene fraction containing a contaminating proportion of phenyl acetylene comprising subjecting said light oil styrene fraction to fractional distillation under conditions such as to obtain a still residue containing polymerized material including polymerized styrene of low molecular weight, separating said polymerized material from unpolymerized material contained in said still residue, subjecting said separated polymerized material in attenuated form to heating under temperature conditions between 350° C. and 600° C. and for a period of time sufficient to effect depolymerization but not exceeding five minutes, and recovering monomeric styrene in purified form containing less phenyl acetylene contamination.

FRANK J. SODAY.